United States Patent
Klun et al.

(10) Patent No.: US 6,740,413 B2
(45) Date of Patent: May 25, 2004

(54) ANTISTATIC COMPOSITIONS

(75) Inventors: Thomas P. Klun, Lakeland, MN (US); William M. Lamanna, Stillwater, MN (US); Phat T. Pham, Little Canada, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 50 days.

(21) Appl. No.: 09/992,878

(22) Filed: Nov. 5, 2001

(65) Prior Publication Data

US 2003/0099802 A1 May 29, 2003

(51) Int. Cl.$^7$ .......................... B32B 27/00; B32B 17/10; B05D 3/02; D06M 5/00
(52) U.S. Cl. ................. 428/421; 428/441; 428/451; 428/500; 427/372.2; 427/384; 252/8.61; 252/8.91
(58) Field of Search .................. 428/421, 441, 428/451, 500; 427/372.2, 384; 252/8.61, 8.91

(56) References Cited

U.S. PATENT DOCUMENTS

| | | |
|---|---|---|
| 2,701,814 A | 2/1955 | Smith |
| 2,732,398 A | 1/1956 | Brice et al. |
| 2,803,656 A | 8/1957 | Ahlbrecht et al. |
| 3,476,753 A | 11/1969 | Hansen |
| 3,723,512 A | 3/1973 | Niederprum et al. |
| 3,728,151 A | 4/1973 | Sherman et al. |
| 3,816,229 A | 6/1974 | Bierbrauber |
| 3,896,035 A | 7/1975 | Schultz et al. |
| 3,899,563 A | 8/1975 | Oxenrider et al. |
| 3,901,727 A | 8/1975 | Loudas |
| 3,916,053 A | 10/1975 | Sherman et al. |
| 3,968,066 A | 7/1976 | Mueller |
| 4,014,880 A | 3/1977 | Dowd et al. |
| 4,043,923 A | 8/1977 | Loudas |
| 4,313,978 A | 2/1982 | Stevens et al. |
| 4,335,201 A | 6/1982 | Miller et al. |
| 4,439,505 A | 3/1984 | Perlstein et al. |
| 4,478,922 A | 10/1984 | Perlstein et al. |
| 4,582,781 A | 4/1986 | Chen et al. |
| 4,847,187 A | 7/1989 | Ono et al. |
| 4,939,204 A | 7/1990 | Efford |
| 4,975,363 A | 12/1990 | Cavallo et al. |
| 5,064,699 A | 11/1991 | Havens et al. |
| 5,145,727 A | 9/1992 | Potts et al. |
| 5,149,576 A | 9/1992 | Potts et al. |
| 5,171,641 A | 12/1992 | Roberts et al. |
| 5,273,840 A | 12/1993 | Dominey |
| 5,446,134 A | 8/1995 | Armand et al. |
| 5,478,486 A | 12/1995 | Incorvia |
| 5,502,251 A | 3/1996 | Pohmer et al. |
| 5,503,967 A | 4/1996 | Furlan et al. |
| 5,514,493 A | 5/1996 | Waddell et al. |
| 5,518,788 A | 5/1996 | Invie |
| 5,525,261 A | 6/1996 | Incorvia et al. |
| 5,534,192 A | 7/1996 | Incorvia et al. |
| 5,541,049 A | 7/1996 | Ballerini et al. |
| 5,554,664 A | 9/1996 | Lamanna et al. |
| 5,591,482 A | 1/1997 | He et al. |
| 5,688,884 A | 11/1997 | Baker et al. |
| 5,723,664 A | 3/1998 | Sakaguchi et al. |
| 5,874,616 A | 2/1999 | Howells et al. |
| 5,965,206 A | 10/1999 | Hilti et al. |
| 6,294,289 B1 | 9/2001 | Fanta et al. |

(List continued on next page.)

FOREIGN PATENT DOCUMENTS

| | | |
|---|---|---|
| BE | 876238 | 11/1979 |
| DE | 4016535 | 9/1993 |
| EP | 0 047 903 B1 | 8/1981 |
| EP | 0 047 903 B1 | 5/1984 |

OTHER PUBLICATIONS

Product Information: "Fatty Amine Ethoxylates," Huntsman Corporation, Salt Lake City, UT, (Apr. 9, 2001), 2 pages.
Product Information: "JEFFAMINE® Polyoxyalkylene Amines," Huntsman Corporation, Salt Lake City, UT, (Apr. 9, 2001), 2 pages.
Book Excerpt: *Amphoteric Surfactants*, edited by Eric G. Lomax, Marcel Dekker Inc., (1996), pp. 13–17, no month.
Book Excerpt: *Organofluorine Chemicals and Their Industrial Applications*, edited by R. E. Banks, Ellis Horwood Ltd. (1979), pp. 53–57, no month.
Article: Hendricks, "Industrial Fluorochemicals," *Ind. Eng. Chem.*, vol. 45, No. 1, (Jan., 1953), pp. 99–105.
Article: Bernett et al., "Wetting of Low–Energy Solids by Aqueous Solutions of Highly Fluorinated Acids and Salts[1]," *J. Phys. Chem.*, vol. 63, (Nov., 1959), pp. 1911–1916.
Book Page: *Preparation, Properties, and Industrial Applications of Organofluorine Compounds*, edited by R. E. Banks, Ellis Horwood Ltd. (1982), P. 25, no month.
Article: Koshar et al., "Bis(perfluoroalkylsulfonyl)methanes and Related Disulfones," *J. Org. Chem.*, vol. 38, No. 19, (1973), pp. 3358–3363, no month.
Article: Wente, "Superfine Thermoplastic Fibers," *Industrial and Engineering Chemistry*, vol. 48, No. 8, (Aug., 1956), pp. 1342–1346.
Report: Wente et al., "Manufacture of Superfine Organic Fibers," Naval Research Laboratory Report 4364, (May 25, 1954), pp. 1–15.
Article: Davis, "The Separation of Airborne Dust and Particles", *The Institution of Mechanical Engineers*, pp. 185–198, no date.
J. Am. Chem. Soc., "Fluorinated Surfactants and Repellents", Jimmie R. Baran, Jr., Second Edition, vol. 123, No. 36, 2001, no month.
ASTM Standard D–257, Standard Test Methods for DC Resistance or Conductance of Insulating Materials, pp. 106–115, no month.

*Primary Examiner*—Deborah Jones
*Assistant Examiner*—G. Blackwell-Rudasill

(57) ABSTRACT

An antistatic composition comprising (a) at least one polymeric salt consisting of (i) at least one polyoxyalkylene ammonium cation, and (ii) a fluorinated anion. The composition exhibits good antistatic characteristics.

17 Claims, No Drawings

FOREIGN PATENT DOCUMENTS

| | | |
|---|---|---|
| EP | 0 370 404 A2 | 5/1990 |
| EP | 0 398 353 A1 | 11/1990 |
| EP | 0 416 741 A1 | 3/1991 |
| EP | 0 363 094 B1 | 8/1993 |
| EP | 0 752 711 A1 | 1/1997 |
| EP | 0 331 030 A1 | 2/1999 |
| EP | 0 663 612 B1 | 3/2000 |
| EP | 1 020 438 A2 * | 7/2000 |
| JP | 46-25558 | 7/1971 |
| JP | 47-20201 | 6/1972 |
| JP | 50-45055 | 4/1975 |
| JP | 50045055 | 4/1975 |
| JP | 53-15747 | 5/1978 |
| JP | 55149938 | 11/1980 |
| JP | 60221442 | 11/1985 |
| JP | 62225517 | 10/1987 |
| JP | 63071923 | 4/1988 |
| JP | 63295667 | 12/1988 |
| JP | 63308032 | 12/1988 |
| JP | 01075534 | 3/1989 |
| JP | 11116752 | 4/1990 |
| JP | 05289224 | 11/1993 |
| JP | 5-302077 | 11/1993 |
| JP | 08092450 | 4/1996 |
| JP | 08208889 | 8/1996 |
| JP | 08100169 | 9/1996 |
| JP | 09255939 | 9/1997 |
| JP | 11092751 | 6/1999 |
| SU | 406849 | 8/1974 |
| SU | 427962 | 6/1975 |
| SU | 446522 | 7/1975 |
| SU | 448199 | 10/1975 |
| SU | 468527 | 11/1980 |
| SU | 802429 | 2/1981 |
| SU | 802430 | 2/1981 |
| SU | 854949 | 8/1981 |
| SU | 749081 | 12/1983 |
| SU | 749084 | 12/1983 |
| WO | WO 96/15479 | 5/1996 |
| WO | WO 96/24929 | 8/1996 |
| WO | WO 99/02611 | 1/1999 |
| WO | WO 99/30381 | 6/1999 |
| WO | WO 01/25326 | 4/2001 |
| WO | WO 01/49925 | 7/2001 |
| ZA | 984155 | 5/1998 |

* cited by examiner

ANTISTATIC COMPOSITIONS

FIELD OF THE INVENTION

This invention relates to antistats or antistatic agents and compositions that exhibit antistatic characteristics. This invention further relates to fibers, films, fabrics, coatings, or molded or blown articles comprising the compositions. In other aspects, this invention relates to a topical treatment composition and to processes for imparting antistatic characteristics to insulating materials.

BACKGROUND OF THE INVENTION

Antistats or antistatic agents are used to dissipate electrostatic or static charge. Electrostatic charge buildup is responsible for a variety of problems in the processing and the use of many industrial products and materials. Electrostatic charging can cause materials to stick together or to repel one another. In addition, static charge buildup can cause objects to attract dirt and dust that can lead to fabrication or soiling problems and can impair product performance.

Sudden electrostatic discharges from insulating objects can also be a serious problem. With photographic film, these discharges can cause fogging and the appearance of artifacts. When flammable materials are present, a static electric discharge can serve as an ignition source, resulting in fires and/or explosions.

Electrostatic charge is a particular problem in the electronics industry, because modem electronic devices are extremely susceptible to permanent damage by electrostatic discharges. The buildup of electrostatic charge on insulating objects is especially common and problematic under conditions of low humidity and when liquids or solids move in contact with one another (tribocharging).

Static charge buildup can be controlled by increasing the electrical conductivity of a material. This can be accomplished by increasing ionic or electronic conductivity. The most common means of controlling static accumulation today is by increasing electrical conductivity through moisture adsorption. This is commonly achieved by adding moisture to the surrounding air (humidification) or by the use of hygroscopic antistatic agents, which are generally referred to as humectants because they rely on the adsorption of atmospheric moisture for their effectiveness. Most antistatic agents operate by dissipating static charge as it builds up; thus, static decay rate and surface conductivity are common measures of the effectiveness of antistatic agents.

Antistatic agents can be applied to the surface (external antistat) or be incorporated into the bulk (internal antistat) of the otherwise insulating material. Internal antistats are commonly employed in polymers such as plastics. Generally, internal antistats fall into one of the following classes: (1) ones that are mixed directly into a molten polymer during melt processing; (2) ones that are mixed into a polymer solution, coated, and dried, or (3) ones that dissolve into a monomer (with or without a solvent) that is subsequently polymerized.

Known antistatic agents cover a broad range of chemical classes, including organic amines and amides, esters of fatty acids, organic acids, polyoxyethylene derivatives, polyhydridic alcohols, metals, carbon black, semiconductors, and various organic and inorganic salts. Many are also surfactants and can be neutral or ionic in nature.

Many low molecular weight, neutral antistats have sufficiently high vapor pressures and thus are unsuitable for use at high temperatures (e.g., polymer melt processing) due to material losses that occur via evaporation. Many other neutral antistats have insufficient thermal stability to survive polymer melt processing or other high temperature processing conditions.

Most nonmetallic antistats are humectants that rely on the adsorption and conductivity of water for charge dissipation. Thus, their effectiveness is typically diminished at low atmospheric humidity. Because many of these antistatic agents are also water soluble, they are easily removed by exposure of the material to water (e.g., washing) and therefore are not very durable.

Metal salts of inorganic, organic, and fluoroorganic anions are also useful as antistatic agents in certain polymer compositions. Alkali metal salts are most commonly employed due to cost and toxicity considerations and to the high affinity of alkali metal cations, especially lithium, for water. But most metal salts are not compatible with polymers of moderate to low polarity, such as polypropylene, polyester, and polycarbonate. This incompatibility can result in inadequate antistat performance and/or an unacceptable reduction in physical properties or transparency in a finished polymeric article. Consequently, the use of metal salts as internal antistatic agents is generally limited to highly polar and/or hydrophilic polymer matrices.

Thus, there remains a need for antistatic agents to impart good antistatic characteristics to insulating materials in a cost effective manner and that, in particular, can be utilized as internal antistatic melt additives without suffering thermal decomposition, or causing processing problems or melt defects.

SUMMARY OF THE INVENTION

Advantageously, the present invention provides antistatic agents that exhibit good antistatic properties and that are melt processable. Briefly, in one aspect, the present invention provides antistatic agents comprising at least one polymeric salt. This salt consists of at least one cation having at least one polyoxyalkylene (POA) moiety bonded to a single ammonium center and a fluorinated anion. The cation(s) is represented by the following formula:

$^+N[(R^1)_{4-y}][[POA]R^2]_y$ where POA is either a homopolymer or a copolymer that is random, blocked, or alternating, and POA comprises 2 to 50 units represented by the formula $((CH_2)_{m'}CH(R^3)O)$ where each unit independently has m', an integer from 1 to 4, and $R^3$. $R^3$ is independently hydrogen or a lower alkyl group (i.e., containing 1 to 4 carbon atoms). $R^1$ is independently an alkyl, an alicyclic, an aryl, an alkalicyclic, an arylalicyclic, or an alicyclicaryl group that optionally contains one or more heteroatoms (e.g., sulfur, nitrogen, oxygen, chlorine, bromine, or fluorine). $R^2$ is independently hydrogen, an alkyl, an alicyclic, an aryl, an alkalicyclic, an arylalicyclic, or an alicyclicaryl group that optionally contains one or more heteroatoms (e.g., sulfur, nitrogen, oxygen, chlorine, bromine, or fluorine). And y is an integer from 1 to 4.

The fluorinated anion is represented by one of the following formulae:

$$R_fSO_3^- \qquad (1)$$

$$^-O_3SR_{f2}SO_3^- \qquad (2)$$

where $R_f$ is independently a perfluoroalkyl, fluoroalkyl, or fluoroaryl group having from 1 to about 12 carbon atoms and $R_{f2}$ is independently a perfluoroalkylene, fluoroalkylene, or fluoroarylene group having from 1 to about 10 carbon atoms.

In another aspect, the present invention provides antistatic agents as polymer melt additives for thermoplastic polymers and as additives for thermoset polymers. The antistatic agents comprise at least one polymeric salt that consists of at least one cation having at least one polyoxyalkylene moiety bonded to a single ammonium center and a fluorinated anion.

The cation(s) is represented by the following formula:

$$^+N[(R^1)_{4-y}][[POA]R^2]_y$$

where POA is either a homopolymer or a copolymer that is random, blocked, or alternating, and POA comprises 2 to 50 units represented by the formula $((CH_2)_{m'}CH(R^3)O)$ where each unit independently has m', an integer from 1 to 4, and $R^3$. $R^3$ is independently hydrogen or a lower alkyl group (i.e., containing 1 to 4 carbon atoms). $R^1$ is independently an alkyl, an alicyclic, an aryl, an alkalicyclic, an arylalicyclic, and an alicyclicaryl group that optionally contains one or more heteroatoms (e.g., sulfur, nitrogen, oxygen, chlorine, bromine, or fluorine). $R^2$ is independently hydrogen, an alkyl, an alicyclic, an aryl, an alkalicyclic, an arylalicyclic, or an alicyclicaryl group that optionally contains one or more heteroatoms (e.g., sulfur, nitrogen, oxygen, chlorine, bromine, or fluorine). And y is an integer from 1 to 4.

The fluorinated anion is independently represented by one of the following formulae:

$$R_f SO_3^-  \quad (1)$$

$$^-O_3SR_{f2}SO_3^- \quad (2)$$

where $R_f$ is independently a perfluoroalkyl, fluoroalkyl, or fluoroaryl group having from 1 to about 12 carbon atoms and $R_{f2}$ is independently a perfluoroalkylene, fluoroalkylene, or fluoroarylene group having from 1 to about 10 carbon atoms.

In yet another aspect, the present invention provides topical applications of antistatic agents, where the antistatic agents comprise at least one polymeric salt. This salt consists of at least one cation having at least one polyoxyalkylene moiety bonded to a single ammonium center, and a fluorinated anion.

The cation(s) is represented by the following formula:

$$^+N[(R^1)_{4-y}][[POA]R^2]_y$$

where POA is either a homopolymer or a copolymer that is random, blocked, or alternating, and POA comprises 2 to 50 units represented by the formula $((CH_2)_{m'}CH(R^3)O)$ where each unit independently has m', an integer from 1 to 4, and $R^3$. $R^3$ is independently hydrogen or a lower alkyl group (i.e., containing 1 to 4 carbon atoms). $R^1$ is independently an alkyl, an alicyclic, an aryl, an alkalicyclic, an arylalicyclic, or an alicyclicaryl group that optionally contains one or more heteroatoms (e.g., sulfur, nitrogen, oxygen, chlorine, bromine, or fluorine). $R^2$ is independently hydrogen, an alkyl, an alicyclic, an aryl, an alkalicyclic, an arylalicyclic, or an alicyclicaryl group that optionally contains one or more heteroatoms (e.g., sulfur, nitrogen, oxygen, chlorine, bromine, or fluorine). And y is an integer from 1 to 4.

The fluorinated anion is independently represented by one of the following formulae:

$$R_f SO_3^- \quad (1)$$

$$^-O_3SR_{f2}SO_3^- \quad (2)$$

where $R_f$ is independently a perfluoroalkyl, fluoroalkyl, or fluoroaryl group having from 1 to about 12 carbon atoms and $R_{f2}$ is independently a perfluoroalkylene, fluoroalkylene, or fluoroarylene group having from 1 to about 10 carbon atoms.

In other aspects, this invention provides fiber, fabric, film, a coating, or a molded or blown article comprising the composition of the invention; processes for imparting antistatic characteristics to a substrate or an insulating material, for example, by melt addition or by topical treatment; a topical treatment composition comprising the antistat agent of the present invention; and a melt blend comprising the antistatic agent of the present invention in a thermoplastic polymer.

DETAILED DESCRIPTION OF THE ILLUSTRATIVE EMBODIMENTS

The present invention relates to sulfonate salts and their use as antistatic agents and these antistatic agents in compositions. Antistatic agents and antistats are used interchangeably herein. Antistatic agents preferably provide ionic conductivity, good solubility in organic media, good stability, and good blooming. Advantageously, the salts of the present invention exhibit all of these features. In addition, the salts of the present invention have good thermal stability, can be used as melt additives, and have good performance at low humidity.

The antistatic agents of the present invention can be used as additives (internal antistats) or as a coating or a topical treatment (external antistats) to impart antistatic characteristics to polymers or to other insulating materials. The insulating material is typically a thermoplastic or thermosetting polymer (preferably, a thermoplastic), and the composition can be prepared by forming a blend (preferably, a melt blend) of the components. In particular, the present invention is directed to antistatic agents and compositions comprising these antistatic agents that contain polyoxyalkylene-substituted quaternary ammonium cations having a single ammonium center and at least one fluorinated anion.

A "blend" is defined herein as a mixture of at least one antistat and at least one insulating material or a reactive precursor to the insulating material.

A "topical treatment" is defined herein as at least one antistat applied to the surface of a preformed insulating material or substrate, typically in a solvent or a dispersant.

Antistats

Polymeric salts suitable for use as antistats of the invention consist of at least one organic polymeric ammonium cation and a fluorinated anion. These salts can be used alone or in combination as an antistatic agent.

Polyoxyalkylene Ammonium Cation

The antistatic agent of the present invention comprises a polymeric salt. This salt consists of at least one cation having at least one polyoxyalkylene (POA) moiety bonded to a quaternary ammonium center, preferably a single cation having at least one polyoxyalkylene moiety bonded to a quaternary ammonium center.

The cation(s) is represented by the following formula:

$$^+N[(R^1)_{4-y}][[POA]R^2]_y$$

where POA is either a homopolymer or a copolymer that is random, blocked, or alternating, and POA comprises 2 to 50 units represented by the formula $((CH_2)_m CH(R^3)O)$ where each unit independently has m, an integer from 1 to 4, and $R^3$. $R^3$ is independently hydrogen or a lower alkyl group (i.e., containing 1 to 4 carbon atoms). $R^1$ is independently an alkyl, an alicyclic, an aryl, an alkalicyclic, an arylalicyclic, or an alicyclicaryl group that optionally contains one or more heteroatoms (e.g., sulfur, nitrogen, oxygen, chlorine, bromine, or fluorine). $R^2$ is independently hydrogen, an alkyl, an alicyclic, an aryl, an alkalicyclic, an arylalicyclic, or an alicyclicaryl group that optionally contains one or more heteroatoms (e.g., sulfur, nitrogen, oxygen, chlorine, bromine, or fluorine). And y is an integer from 1 to 4.

$R^1$ has from 1 to about 50 carbon atoms, preferably 1 to about 20 carbon atoms, and more preferably from about 10 to about 20 carbon atoms. $R^2$ is hydrogen or has from 1 to about 20 carbon atoms, preferably 1 to about 10 carbon atoms, and more preferably 1 to about 4 carbon atoms. $R^3$ is hydrogen or has from 1 to about 10 carbon atoms, and preferably 1 to about 4 carbon atoms.

Synthesis of these cations is well known in the art and typically involves the alkylation of the corresponding tertiary amines using methods known in the art. Additionally, many of these cations are commercially available in the form of salts of nonfluorinated organic or inorganic anions.

Examples of specific cations include, but are not limited to, where the number of repeat units of the POA is approximate,

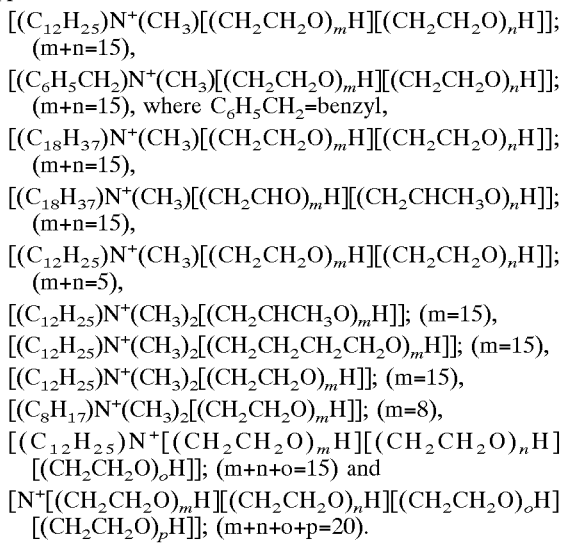

Fluorinated Anions

The fluorinated anions of the present invention are either fully fluorinated, that is perfluorinated, or partially fluorinated alkyl or aryl sulfonates (within the organic portion). Preferred fluorinated anions include those that comprise a highly fluorinated alkanesulfonate group, that is, a perfluoroalkanesulfonate group or a partially fluorinated alkanesulfonate group wherein all non-fluorine carbon-bonded substituents are bonded to carbon atoms other than the carbon atom that is directly bonded to the sulfonate group (preferably, all non-fluorine carbon-bonded substituents are bonded to carbon atoms that are more than two carbon atoms away from the sulfonate group).

Preferably, the fluorinated anion is at least about 80 percent fluorinated (that is, at least about 80 percent of the carbon-bonded substituents of the anion are fluorine atoms). More preferably, the anion is perfluorinated (that is, fully fluorinated, where all of the carbon-bonded substituents are fluorine atoms). The anions, including the preferred perfluorinated anions, can contain one or more catenated (that is, in-chain) or terminal heteroatoms such as, for example, nitrogen, oxygen, or sulfur (e.g., $SF_5$, or $SF_4$).

Generally, the fluorinated anion of the present invention is represented by one of the following formulae:

$$R_f SO_3^-  \quad (1)$$

$$^-O_3SR_{f2}SO_3^- \quad (2)$$

where $R_f$ is independently a perfluoroalkyl, fluoroalkyl, fluoroaryl group. $R_f$ can be cyclic, or acyclic. Typically, $R_f$ comprises from 1 to about 12 carbon atoms, preferably from 1 to about 8, and more preferably from 1 to about 4 carbon atoms. $R_{f2}$ is independently a perfluoroalkylene, fluoroalkylene, or fluoroarylene group. $R_{f2}$ comprises 1 to about 10 carbon atoms, more preferably 2 to about 6 carbon atoms. $R_{f2}$ can also be cyclic or acyclic. Fluoroaryl includes aromatic rings where some or all of the hydrogen atoms are substituted with fluorine atoms or perfluoroalkyl groups.

Representative examples of fluorinated anions of the present invention include, but are not limited to, perfluoroalkanesulfonates such as, $CF_3SO_3^-$, $C_4F_9SO_3^-$, $C_6F_{13}SO_3^-$, $C_8F_{17}SO_3^-$, and cyclo-$C_6F_{11}SO_3^-$; fluoroarylsulfonates such as, 4-$CF_3$—$C_6H_4SO_3^-$, 3,5-$(CF_3)_2C_6H_3SO_3^-$, and $C_6F_5SO_3^-$; heteroatom-containing fluoroalkanesulfonates such as $CF_3OCF_2CF_2SO_3^-$, $(CF_3)_2NCF_2CF_2SO_3^-$, and $SF_5CF_2CF_2SO_3^-$; and difunctional fluoroalkanesulfonates or fluoroarylsulfonates such as $^-O_3S(CF_2)_3SO_3^-$, $^-O_3S(CF_2)_4SO_3^-$, $^-O_3S(CF_2)_2O(CF_2)_2SO_3^-$, $^-O_3SC_6F_4SO_3^-$, and $^-O_3SCF_2CF_2N(CF_2CF_2)_2NCF_2CF_2SO_3^-$.

The fluorinated anions can be prepared by standard methods known in the art. These methods include the anion precursor preparative methods described in the following references, the descriptions of which are incorporated herein by reference: sulfonate precursors—U.S. Pat. No. 5,176,943 (Wou), U.S. Pat. No. 4,582,781 (Chen et al.), U.S. Pat. No. 3,476,753 (Hanson), and U.S. Pat. No. 2,732,398 (Brice et al.); and sulfonate precursors having catenated oxygen or nitrogen in a fluorochemical group—U.S. Pat. No. 5,514,493 (Waddell et al). The fluorinated anion can be either monofunctional or multifunctional, i.e., can contain more than one sulfonate group, e.g., difunctional or trifunctional, etc. preferably, the fluorinated anion is monofunctional or difunctional, more preferably monofunctional.

Antistatic Agents

The antistats can be either solids or liquids under ambient conditions.

For use as polymer melt additives, the antistats of the present invention are preferably stable at temperatures of about 240° C. and above (more preferably, about 280° C. and above). In addition, for polymer melt additive applications, the antistats are preferably miscible with the insulating material at the melt processing temperature. (In other words, the thermal decomposition temperature (i.e., the temperature where there is 5 percent or more weight loss using thermal gravimetric analysis (TGA) as described in Test Method 1) of the antistats preferably is above these temperatures.)

The antistats of the present invention are represented by the following formula:

$$[^+N[(R^1)_{4-y}][[POA]R^2]_y]_x[X^-]$$

where POA is either a homopolymer or a copolymer that is random, blocked, or alternating, and POA comprises 2 to 50 units represented by the formula $((CH_2)_{m'}CH(R^3)O)$ where each unit independently has m', an integer from 1 to 4, and $R^3$. $R^3$ is independently hydrogen or a lower alkyl group (i.e., containing 1 to 4 carbon atoms). $R^1$ is independently an alkyl, an alicyclic, an aryl, an alkalicyclic, an arylalicyclic, or an alicyclicaryl group that optionally contains one or more heteroatoms (e.g., sulfur, nitrogen, oxygen, chlorine, bromine, or fluorine). $R^2$ is independently hydrogen, an alkyl, an alicyclic, an aryl, an alkalicyclic, an arylalicyclic, or an alicyclicaryl group that optionally contains one or more heteroatoms (e.g., sulfur, nitrogen, oxygen, chlorine, bromine, or fluorine). And y is an integer from 1 to 4 and u is an integer from 1 to 2. X is a fluorinated anion as set forth in formula (1) or (2) above. If the fluorinated anion is monofunctional, u is 1 and if the fluorinated anion is difunctional, u is 2.

Antistats of the present invention can be prepared by ion exchange or metathesis reactions, which are well known in the art. For example, a precursor ammonium salt can be combined with an acid or salt of a fluorinated sulfonate anion in aqueous solution. Upon combining, the desired product (the ammonium salt of the fluorinated sulfonate anion) separates (as a liquid or solid) or can be preferentially extracted into an organic solvent (for example, methylene chloride). The product can be isolated by filtration or by liquid/liquid phase separation, can then be washed with water to completely remove byproduct acid or salt (if present), and can then be dried thoroughly under vacuum to remove all volatiles (including water and organic solvent, if present). Similar metathesis reactions can be conducted in organic solvents (for example, acetonitrile) rather than in water, and, in this case, the salt byproduct generally preferentially precipitates, while the desired product salt remains dissolved in the organic solvent (from which it can be isolated using standard experimental techniques).

Representative examples of useful antistats include, but are not limited to, where the number of repeat units of the POA is approximate,

[(C$_{12}$H$_{25}$)N$^+$(CH$_3$)[(CH$_2$CH$_2$O)$_m$H][(CH$_2$CH$_2$O)$_n$H]][$^-$O$_3$SCF$_3$]; (m+n=15),

[(C$_{12}$H$_{25}$)N$^+$(CH$_3$)[(CH$_2$CH$_2$O)$_m$H][(CH$_2$CH$_2$O)$_n$H]][$^-$O$_3$SC$_4$F$_9$]; (m+n=15),

[(C$_6$H$_5$CH$_2$)N$^+$(CH$_3$)[(CH$_2$CH$_2$O)$_m$H][(CH$_2$CH$_2$O)$_n$H]][$^-$O$_3$SC$_4$F$_9$]; (m+n=15), where C$_6$H$_5$CH$_2$=benzyl,

[(C$_{18}$H$_{37}$)N$^+$(CH$_3$)[(CH$_2$CH$_2$O)$_m$H][(CH$_2$CH$_2$O)$_n$H]][$^-$O$_3$SCF$_3$]; (m+n=15),

[(C$_{18}$H$_{37}$)N$^+$(CH$_3$)[(CH$_2$CH$_2$O)$_m$H][(CH$_2$CH$_2$O)$_n$H]][$^-$O$_3$SC$_4$F$_9$]; (m+n=15),

[(C$_{18}$H$_{37}$)N$^+$(CH$_3$)[(CH$_2$CHO)$_m$H][(CH$_2$CHCH$_3$O)$_n$H]][$^-$O$_3$SC$_4$F$_9$]; (m+n=15),

[(C$_{12}$H$_{25}$)N$^+$CH$_3$[(CH$_2$CH$_2$O)$_m$H][(CH$_2$CH$_2$O)$_n$H]][$^-$O$_3$SCF$_3$]; (m+n=5),

[(C$_8$H$_{17}$)N$^+$(CH$_3$)$_2$[(CH$_2$CH$_2$O)$_m$H]][$^-$O$_3$SCF$_3$]; (m=15),

[(C$_8$H$_{17}$)N$^+$(CH$_3$)$_2$[(CH$_2$CH$_2$O)$_m$H]][$^-$O$_3$SC$_4$F$_9$]; (m=15),

[(C$_{12}$H$_{25}$)N$^+$(CH$_3$)$_2$[(CH$_2$CHCH$_3$O)$_m$H]][$^-$O$_3$SCF$_3$]; (m=15),

[(C$_{12}$H$_{25}$)N$^+$(CH$_3$)$_2$[(CH$_2$CH$_2$ CH$_2$CH$_2$O)$_m$H]][$^-$O$_3$SCF$_3$]; (m=15),

[(C$_{12}$H$_{25}$)N$^+$(CH$_3$)$_2$[(CH$_2$CH$_2$O)$_m$H]][$^-$O$_3$SCF$_3$]; (m=15)

[(C$_8$H$_{17}$)N$^+$(CH$_3$)$_2$[(CH$_2$CH$_2$O)$_m$H]][$^-$O$_3$SCF$_3$]; (m=8)

[(C$_{12}$H$_{25}$)N$^+$[(CH$_2$CH$_2$O)$_m$H][(CH$_2$CH$_2$O)$_n$H][(CH$_2$CH$_2$O)$_o$H]][$^-$O$_3$SCF$_3$]; (m+n+o=15),

[(C$_{12}$H$_{25}$)N$^+$[(CH$_2$CH$_2$O)$_m$H][(CH$_2$CH$_2$O)$_n$H][(CH$_2$CH$_2$O)$_o$H]][$^-$O$_3$SC$_4$F$_9$]; (m+n+o=15),

[N$^+$[(CH$_2$CH$_2$O)$_m$H][(CH$_2$CH$_2$O)$_n$H][(CH$_2$CH$_2$O)$_o$H][(CH$_2$CH$_2$O)$_p$H]][$^-$O$_3$SCF$_3$]; (m+n+o+p=20),

[(C$_{12}$H$_{25}$)N$^+$(CH$_3$)[(CH$_2$CH$_2$O)$_m$H][(CH$_2$CH$_2$O)$_n$H]]$_2$[$^-$O$_3$SCF$_2$CF$_2$CF$_2$SO$_3$—]; (m+n=15),

[(C$_{12}$H$_{25}$)N$^+$(CH$_3$)[(CH$_2$CH$_2$O)$_m$H][(CH$_2$CH$_2$O)$_n$H]]$_2$[$^-$O$_3$SCF$_2$CF$_2$N(CF$_2$CF$_2$)$_2$N CF$_2$CF$_2$SO$_3$$^-$]; (m+n=15),

[(C$_{12}$H$_{25}$)N$^+$(CH$_3$)[(CH$_2$CH$_2$O)$_m$H][(CH$_2$CH$_2$O)$_n$H]][$^-$O$_3$SC$_6$H$_4$CF$_3$]; (m+n=15),

[(C$_{12}$H$_{25}$)N$^+$(CH$_3$)[(CH$_2$CH$_2$O)$_m$H][(CH$_2$CH$_2$O)$_n$H]][$^-$O$_3$SC$_6$F$_5$]; (m+n=15) and

[(C$_{12}$H$_{25}$)N$^+$(CH$_3$)[(CH$_2$CH$_2$O)$_m$H][(CH$_2$CH$_2$O)$_n$H]]$_2$[$^-$O$_3$SC$_6$F$_4$SO$_3$$^-$]; (m+n=15).

Insulating Materials

The antistatic agents of the present invention can be used in coating compositions or with various insulating materials (i.e., coated directly onto an insulating material) provided these antistatic agents are compatible with the coating and/or insulating materials. Thus, the antistatic agent preferably performs well as an antistat and does not adversely affect other properties of the coating and/or insulating materials.

The antistatic agents of the present invention are typically about 0.1 to about 50 weight percent of the antistatic coating, based on the solids in the coating.

Antistatic coatings comprising the antistatic agent of the present invention can be applied from aqueous or organic solvents (including solutions of binders) to a variety of insulating materials including photographic or x-ray film, x-ray screens, fabric, fibers, electronic components, electronic packaging, compact discs, molded or blown objects (e.g., surgical gowns), and the like. The choice of solvent varies with the insulating material.

Insulating materials that are suitable for topical treatment include materials that have relatively low surface and bulk conductivity and that are prone to static charge build-up. These materials include both synthetic and naturally-occurring polymers (or the reactive precursors thereof, for example, mono- or multifunctional monomers or oligomers) that can be either organic or inorganic in nature, as well as ceramics, glasses, and ceramic/polymer composites, ceramers, or the reactive precursors thereof.

Insulating materials that are suitable for blends with the antistatic agent of the present invention include thermoplastics, thermosets, ceramers, or reactive precursors.

Suitable synthetic polymers (which can be either thermoplastic or thermoset) include commodity plastics such as, for example, poly(vinyl chloride), polyethylenes (high density, low density, very low density), polypropylene, polybutylene, and polystyrene; engineering plastics such as, for example, polyesters (including, for example, poly (ethylene terephthalate) and poly(butylene terephthalate), polyamides (aliphatic, amorphous, aromatic), polycarbonates (for example, aromatic polycarbonates such as those derived from bisphenol A), polyoxymethylenes, polyacrylates and polymethacrylates (for example, poly(methyl methacrylate)), some modified polystyrenes (for example, styrene-acrylonitrile (SAN) and acrylonitrile-butadiene-styrene (ABS) copolymers), high-impact polystyrenes (SB), fluoroplastics, and blends such as poly(phenylene oxide)-polystyrene and polycarbonate-ABS; high-performance plastics such as, for example, liquid crystalline polymers (LCPs), polyetherketone (PEK), polysulfones, polyimides, and polyetherimides; thermosets such as, for example, alkyd resins, phenolic resins, amino resins (for example, melamine and urea resins), epoxy resins, unsaturated polyesters (including so-called vinyl esters), polyurethanes, allylics (for example, polymers derived from allyldiglycolcarbonate), fluoroelastomers, and polyacrylates; and the like and blends thereof. Suitable naturally occurring polymers include proteinaceous materials such as silk, wool, and leather; and cellulosic materials.

Thermoplastic and thermoset polymers, including those described above, are preferred insulating materials, as these polymers can either be topically treated with the antistat or can be combined with the antistat (in bulk) to form a blend. Melt processing of the antistat into a thermoplastic polymer is preferred, because it eliminates the use of hazardous solvents and VOCs. Preferably, the thermoplastic polymers are melt processable at elevated temperatures, for example, above about 150° C. (more preferably, above about 240° C.; even more preferably, above about 280° C.). Preferred thermoplastic polymers include, for example, polypropylene, polyethylene, polybutylene, copolymers of ethylene and one or more alpha-olefins (for example, poly (ethylene-butene) and poly(ethylene-octene)), polyesters, polyurethanes, polycarbonates, polyetherimides, polyimides, polyetherketones, polysulfones, polystyrenes, ABS copolymers, polyamides, fluoroelastomers, and blends thereof. More preferred are polypropylene, polyethylene, polyesters, poly(ethylene-octene), polyurethanes, polycarbonates, and blends thereof, with polypropylene, polyethylene, polybutylene, poly(ethylene-octene), poly (ethylene-butene), polyurethanes, and blends thereof being most preferred.

The antistatic agent can also be blended with monomers, curable oligomers, or curable polymers followed by polymerization or curing to form a crosslinked thermoset polymer containing the antistat. Preferred thermoset polymers include polyurethanes, epoxy resins, and unsaturated polyesters.

The antistatic agent of the present invention can further be applied to an insulating material using techniques known in the art such as, but not limited to, dip coating, spray coating, swirl coating, spin coating, extrusion hopper coating, curtain coating, gravure coating, air knife coating, and the like. The coating thickness varies as a function of the insulating material.

Preparation and Use of Composition

Preferably, the composition of the invention can be prepared by (a) combining at least one antistat and at least one thermoplastic polymer (optionally, along with other additives) and then melt processing the resulting combination; or (b) combining at least one antistat and at least one thermosetting polymer or ceramer or the reactive precursors thereof (optionally, along with other additives) and then allowing the resulting combination to cure, optionally with the application of heat or actinic radiation. Alternative processes for preparing the composition include, for example, (c) applying a treatment composition comprising at least one antistat to at least a portion of at least one surface of at least one insulating material; (d) dissolving at least one antistat and at least one insulating material in at least one solvent and then casting or coating the resulting solution and allowing evaporation of the solvent, optionally with the application of heat; and (e) combining at least one antistat and at least one monomer (optionally, along with other additives including solvent) and then allowing polymerization of the monomer to occur, optionally with the application of heat or actinic radiation.

To form a melt blend by melt processing, the antistat(s) can be, for example, intimately mixed with pelletized or powdered polymer and then melt processed by known methods such as, for example, molding, melt blowing, melt spinning, or melt extrusion. The antistat(s) can be mixed directly with the polymer, or can be mixed with the polymer in the form of a "master batch" (concentrate) of the antistat (s) in the polymer. If desired, an organic solution of the antistat(s) can be mixed with powdered or pelletized polymer, followed by drying (to remove solvent) and then by melt processing. Alternatively, the antistat(s) can be injected into a molten polymer stream to form a blend immediately prior to, for example, extrusion into fibers or films or molding into articles.

After melt processing, an annealing step can be carried out to enhance the development of antistatic characteristics. In addition to, or in lieu of, this annealing step, the melt processed combination (for example, in the form of a film or a fiber) can also be embossed between two heated rolls, one or both of which can be patterned. An annealing step typically is conducted below the melt temperature of the polymer (for example, in the case of polyamide, at about 100–220° C. for a period of about 30 seconds to about 5 minutes). In some cases, the presence of moisture can improve the effectiveness of the antistat(s), although the presence of moisture is not necessary in order for antistatic characteristics to be obtained.

The antistat(s) can be added to thermoplastic or thermosetting polymer (or, alternatively, to other insulating material) in amounts sufficient to achieve the desired antistatic and repellency properties for a particular application. The amounts can be determined empirically and can be adjusted as necessary or desired to achieve the antistatic properties without compromising the properties of the polymer (or other insulating material). Generally, the antistat(s) can be added in amounts ranging from about 0.1 to about 50 percent by weight (preferably, from about 0.5 to about 10 percent; more preferably, from about 0.75 to about 2.0 percent) based on the weight of polymer (or other insulating material).

In topical treatment of an insulating material, the antistat (s) can be employed alone or in the form of aqueous suspensions, emulsions, or solutions, or as organic solvent (or organic solvent/water) solutions, suspensions, or emulsions. Useful organic solvents include chlorinated hydrocarbons, alcohols (for example, isopropyl alcohol), esters, ketones (for example, methyl ethyl ketone), and mixtures thereof. Generally, the solvent solutions can contain from about 0.1 to about 50 percent, or even up to about 90 percent, by weight non-volatile solids (based on the total weight of the components). Aqueous suspensions, emulsions, or solutions are generally preferred and generally can contain a non-volatile solids content of about 0.1 to about 50 percent, preferably, about 1 to about 10 percent, by weight (based on the total weight of the components). Alternatively, however, topical treatment can be carried out by applying (to at least a portion of at least one surface of at least one insulating material) a topical treatment composition that comprises at least one antistat that is liquid at the use or treatment temperature. This topical treatment process can involve the use of the neat liquid antistat(s), without added solvent, and is thus preferred from an environmental perspective over the use of organic solvent solutions of the antistat(s).

The topical treatment compositions comprising the antistat(s) can be applied to an insulating material by standard methods such as, for example, spraying, padding, dipping, roll coating, brushing, or exhaustion (optionally followed by the drying of the treated material to remove any remaining water or solvent). The material can be in the form of molded or blown articles, sheets, fibers (as such or in aggregated form, for example, yarn, toe, web, or roving, or in the form of fabricated textiles such as carpets), woven and nonwoven fabrics, films, etc.

The topical treatment compositions can be applied in an amount sufficient to achieve the desired antistatic properties for a particular application. This amount can be determined empirically and can be adjusted as necessary or desired to achieve the antistatic properties without compromising the properties of the insulating material.

Any of a wide variety of constructions can be made from the composition of the invention, and these constructions find utility in any application where some level of antistatic characteristic is required. For example, the composition of the invention can be used to prepare films and molded or blown articles, as well as fibers (for example, melt-blown or melt-spun fibers, including microfibers) that can be used to make woven and nonwoven fabrics. These films, molded or blown articles, fibers, and fabrics exhibit antistatic characteristics under a variety of environmental conditions and can be used in a variety of applications.

For example, molded articles comprising the composition of the invention can be prepared by standard methods (for example, by high temperature injection molding) and are particularly useful as, for example, headlamp covers for automobiles, lenses (including eyeglass lenses), casings or circuit boards for electronic devices (for example, computers), screens for display devices, windows (for example, aircraft windows), and the like. Films comprising the composition of the invention can be made by any of the film making methods commonly employed in the art. These films can be nonporous or porous (the latter including films that are mechanically perforated), with the presence and degree of porosity being selected according to the desired performance characteristics. The films can be used as, for example, photographic films, transparency films for use with overhead projectors, tape backings, substrates for coating, and the like.

Fibers comprising the composition of the invention can be used to make woven or nonwoven fabrics that can be used, for example, in making medical fabrics, medical and industrial apparel, fabrics for use in making clothing, home furnishings such as rugs or carpets, and filter media such as chemical process filters or respirators. Nonwoven webs or fabrics can be prepared by processes used in the manufacture of either melt-blown or spun bonded webs. For example, a process similar to that described by Wente in "Superfine Thermoplastic Fibers," Indus. Eng'g Chem. 48, 1342 (1956) or by Wente et al. in "Manufacture of Superfine Organic Fibers," Naval Research Laboratories Report No. 4364 (1954) can be used. Multi-layer constructions made from nonwoven fabrics enjoy wide industrial and commercial utility, for example, as medical fabrics. The makeup of the constituent layers of such multi-layer constructions can be varied according to the desired end-use characteristics, and the constructions can comprise two or more layers of melt-blown and spun bonded webs in many useful combinations such as those described in U.S. Pat. No. 5,145,727 (Potts et al.) and U.S. Pat. No. 5,149,576 (Potts et al.), the descriptions of which are incorporated herein by reference.

The antistat(s) used in the composition of the invention can also find utility as additives to coatings (for example, polymer or ceramer coatings). These coatings can be antistatic and can be used in the photographic industry or as protective coatings for optical or magnetic recording media.

If desired, the composition of the invention can further contain one or more conventional additives commonly used in the art, for example, dyes, pigments, antioxidants, ultraviolet stabilizers, flame retardants, surfactants, plasticizers, tackifiers, fillers, and mixtures thereof. In particular, performance enhancers (for example, polymers such as polybutylene) can be utilized to improve the antistatic characteristics in, for example, melt additive polyolefin applications.

EXAMPLES

The present invention will be further described with reference to the following non-limiting examples and test methods. All parts, percentages, and ratios are by weight unless otherwise specified.

TABLE 1

Table of Components

| COMPONENT | DESCRIPTION | AVAILABLE FROM/PREPARATION |
|---|---|---|
| Dimethyl sulfate | $(CH_3O)_2SO_2$ | Sigma-Aldrich, Milwaukee, Wisconsin |
| ETHOQUAD ™ C/25 | $[C_{12}H_{25}N^+(CH_3)[(CH_2CH_2O)_mH][(CH_2CH_2O)_nH]^-Cl]$ (m + n = 15) ~95% solids in water | Akzo Nobel Surface Chemistry LLC, Chicago, Illinois |
| ETHOQUAD ™ 18/25 | $[C_{18}H_{37}N^+(CH_3)[(CH_2CH_2O)_mH][(CH_2CH_2O)_nH]^-Cl]$ (m + n = 15) ~95% solids in water | Akzo Nobel Surface Chemistry LLC |
| ETHOMEEN ™ C/15 | $[C_{12}H_{25}N[(CH_2CH_2O)_mH][(CH_2CH_2O)_nH]](m + n = 15)$ | Akzo Nobel Surface Chemistry LLC |
| HQ-115 ™ | $LiN(SO_2CF_3)_2$ | Minnesota Mining and Manufacturing Company, (3M), St. Paul, MN |
| Isopropyl alcohol | $CH_3CH(OH)CH_3$ | Sigma-Aldrich |
| Lithium nonaflate | Lithium nonafluorobutanesulfonate | 3M |
| Lithium triflate | Lithium trifluoromethanesulfonate (FC 122) | 3M |
| MEK | Methyl ethyl ketone; 2-Butanone; $CH_3C(O)C_2H_5$ | Sigma-Aldrich |
| Methylene chloride | Dichloromethane; $CH_2Cl_2$ | Sigma-Aldrich |
| $NaHCO_3$ | Sodium hydrogencarbonate | Sigma-Aldrich |
| PE6806 | ASPUN ™ 6806 polyethylene, having a melt flow index of 105 | Dow Chemical Co. Midland, Michigan |
| PP3960 | FINA ™ 3960 polypropylene, melt flow index of about 400 | FINA Oil & Chemical Co. LaPorte, Texas |
| PS440-200 | MORTHANE ™ PS440-200 urethane | Morton Thiokol Corp. Chicago, Illinois |

Test Methods

Test Method I—Thermal Gravimetric Analysis (TGA)

The thermal decomposition of each salt was determined by thermal gravimetric analysis (TGA) under an inert nitrogen atmosphere using a 10° C. per minute temperature ramp using a Perkin-Elmer Thermogravimetric Analyzer TGA 7, manufactured by the Perkin-Elmer Instruments of Norwalk, Conn.

Test Method II—Static Charge Dissipation Test

The static charge dissipation characteristics of nonwoven fabrics, films, and molded sheets were determined using this method. The test materials were cut into 12 cm by 15 cm samples and conditioned at relative humidities (RH) of about 10 percent, 25 percent, and 50 percent for at least 12 hours. The materials were tested at temperatures that ranged from 22–25C. The static charge dissipation time was measured according to Federal Test Method Standard 10113, Method 4046, "Antistatic Properties of Materials", using an ETS Model 406C Static Decay Test Unit (manufactured by Electro-Tech Systems, Inc., Glenside, Pa.). This apparatus induces an initial static charge (Average Induced Electrostatic Charge) on the surface of the flat test material by using high voltage (5000 volts), and a field meter allows observation of the decay time of the surface voltage from 5000 volts (or whatever the induced electrostatic charge was) to 10 percent of the initial induced charge. This is the static charge dissipation time. The lower the static charge dissipation time, the better the antistatic properties are of the test material. All reported values of the static charge dissipation times in this invention are averages (Average Static Decay Rate) over at least 3 separate determinations. Values reported as >60 seconds indicate that the sample tested has an initial static charge that cannot be removed by surface conduction and is not antistatic. When the sample tested did not accept a charge of about 3000 volts or more, it was not considered to have charged sufficiently to be antistatic. Samples were tested in order of decreasing relative humidity. If the value of the average static decay rate had a reported value of >60, testing of samples conditioned at lower relative humidities were discontinued.

Test Method III—Surface Resistivity Test

The Surface Resistivity Test was conducted according to the procedure of ASTM Standard D-257; "D.C. Resistance or Conductance of Insulating Materials". The surface resistivity was measured under these conditions using an ETS Model 872 Wide Range Resistance Meter fitted with a Model 803B probe (Electro-Tech Systems, Inc., Glenside, Pa.). This apparatus applies an external voltage of 10 Volts across two concentric ring electrodes and provides surface resistivity readings in ohm/cm$^2$. The measurements were run at 22° C. and there was a 27% relative humidity.

Preparation and Characterization of Antistats for Static Charge Dissipation Testing Antistat 1

Preparation of $[(C_{12}H_{25})N^+(CH_3)[(CH_2CH_2O)_mH][(CH_2CH_2O)_nH]][^-OSO_2CF_3]$; (m+n=15)

A 1 liter flask equipped with a mechanical stirrer was charged with a 72% aqueous solution of lithium triflate (45.18 grams) and 120.0 mL of water. To this stirred solution, 200.0 grams of ETHOQUAD™ C/25 was added via a dropping funnel over 7 minutes. The resulting mixture was stirred at room temperature for 1.5 hours, was transferred to a separatory funnel, and methylene chloride (400 milliliters) was added to extract the desired product. The methylene chloride organic phase was washed with water (150 ml). The organic phase was collected into a 1 L round bottom and concentrated at 60° C. under aspirator-reduced pressure for 1 hour and then at 110° C. under aspirator-reduced pressure for 1 hour to yield 205.2 g (96% yield) of a brown viscous product. This product was characterized by $^1$H and $^{13}$C NMR and by thermal gravimetric analysis (room temperature to decomposition at a temperature ramp rate of 10° C./minutes).

Antistat 2

Preparation of $[(C_{12}H_{25})N^+(CH_3)[(CH_2CH_2O)_mH][(CH_2CH_2O)_nH]][^-O_3SC_4F_9]$; (m+n=15)

Antistat 2 was prepared in a manner similar to the preparation of Antistat 1, except that the 1 liter flask was charged with 30.6 grams of lithium nonaflate and 125.0 grams of water, and 95.89 grams of ETHOQUAD™ C/25 was added over 15 minutes, followed by extraction with 200 g methylene chloride. The organic layer produced a yield of 109.96 grams (93% yield) of product that was characterized by $^1$H and $^{13}$C NMR and by thermal gravimetric analysis.

Antistat 3

Preparation of $[(C_{18}H_{37})N^+(CH_3)[(CH_2CH_2O)_mH][(CH_2CH_2O)_nH]][^-O_3SCF_3]$; (m+n=15)

Antistat 3 was prepared in a manner similar to the preparation of Antistat 1 except that the 1 liter flask was charged with 13.43 grams of a 72% solids aqueous solution of lithium triflate and 125 grams of water, and 65 grams of ETHOQUAD™ 18/25 was added over 15 minutes, followed by extraction with 200 g methylene chloride. The organic layer produced a yield of 63.77 grams (92.8% yield) of product that was characterized by $^1$H and $^{13}$C NMR and by thermal gravimetric analysis.

Antistat 4

Preparation of $[(C_{18}H_{37})N^+(CH_3)[(CH_2CH_2O)_mH][(CH_2CH_2O)_nH]][^-O_3SC_4F_9]$; (m+n=15)

Antistat 4 was prepared in a manner similar to the preparation of Antistat 1 except that the 1 liter flask was charged with 18.97 grams of lithium nonaflate and 125.0 grams of water and 65 grams of ETHOQUAD™ 18/25 was added over 17 minutes, followed by extraction with 200 g methylene chloride. The organic layer produced a yield of 72.61 grams (93.1% yield) of product that was characterized by $^1$H and $^{13}$C NMR and by thermal gravimetric analysis.

Antistat 5

Preparation of $[(C_{12}H_{25})N^+(CH_3)[(CH_2CH_2O)_mH][(CH_2CH_2O)_nH]][^-O_3SCF_3]$; (m+n=5)

ETHOMEEN™ C/15 (100 grams) was charged to a 250 mL 3-neck round bottom flask, equipped with a mechanical stirrer, along with of NaHCO$_3$ (3 grams). The flask was purged with nitrogen for several minutes, placed in a silicone oil bath, and heated to 110° C. Dimethylsulfate (30.76 grams) was added to the round bottom flask via a dropping funnel at a rate that kept the temperature at 110° C. (+/-3° C.). The reaction was stirred overnight, ultimately producing $[C_{12}H_{25}N^+(CH_3)(CH_2CH_2O)_mH(CH_2CH_2O)_nH][^-O_3SOCH_3]$; (m+n=5).

Antistat 5 was prepared in a manner similar to the preparation of Antistat 1 except that a 500 mL flask was charged with 65 grams of $[(C_{12}H_{25})N^+(CH_3)[(CH_2CH_2O)_mH][(CH_2CH_2O)_nH]][^-O_3SOCH_3]$; (m+n=5), 18.88 grams of isopropyl alcohol, 60.9 grams of water and 26.22 grams of lithium triflate (MW 216.67) was added. The mixture was then extracted with 100 grams of methylene chloride and washed with 60.9 mL of water. The organic phase yielded 59.95 (86.1%) grams of product that was characterized by $^1$H and $^{13}$C NMR and by thermal gravimetric analysis.

Samples of ETHOQUAD™ C/25 and ETHOQUAD™ 18/25 were each dried by placing them in a round bottom flask equipped with distillation head and heated at up to 150° C. for about 1 hour under aspirator pressure until bubbling from the samples ceased. These dehydrated samples were submitted for TGA analysis.

TABLE 2

Thermogravimetric Analysis Data

| ANTISTAT | Wt. % remaining @ given Temp(° C.) | | | |
|---|---|---|---|---|
|  | 200° C. | 240° C. | 280° C. | 320° C. |
| Antistat 1 | 99.5 | 98.9 | 98.4 | 93.4 |
| Antistat 2 | 99.9 | 99.9 | 99.5 | 93.0 |
| Antistat 3 | 99.2 | 98.5 | 97.8 | 95.8 |
| Antistat 4 | 99.3 | 98.7 | 98.2 | 96.5 |
| Antistat 5 | 99.6 | 98.7 | 95.3 | 87.8 |
| ETHOQUAD ™ C/25 | 97.2 | 89.4 | 85.9 | 81.8 |
| ETHOQUAD ™ 18/25 | 97.6 | 90.8 | 85.5 | 82.0 |

When compared to dehydrated ETHOQUAD™ C/25 having a chloride counterion, Antistats 1 and 2 (with the same ammonium cation as ETHOQUAD™ C/25, but having fluorochemical counterions) have less weight loss than ETHOQUAD™ C/25 over the processing range of 200–320° C. Likewise, the data shows that when compared to dehydrated ETHOQUAD™ 18/25 (having a chloride counterion), Antistats 3 and 4 (with the same ammonium cation as ETHOQUAD™ 18/25, but having fluorochemical counterions) have less weight loss than ETHOQUAD™ 18/25 over the processing range of 200–320° C. The greater thermal stability of the compositions of the invention enhances their processability and minimizes exposure to volatile materials.

General Preparation of Nonwoven Samples

Nonwoven thermoplastic samples described below were prepared on a 1.9 centimeter (cm) Brabender extruder with a 25.4 cm die (C. W. Brabender, South Hackensack, N.J.), into blown microfibers with a diameter of less than about 10 microns (described in: Wente, Van A., "Superfine Thermoplastic Fibers", Industrial and Eng. Chemistry, Vol. 48, No. 8, 1956, pp. 1342–1345, and Naval Research Laboratory Report 111437, Apr. 15, 1954). For the PP3960 samples, the first extruder zone was set at 160° C., and all other zones were set at 270° C. The die air temperature was set at 275° C., and the melt temperature was recorded at 279° C. For PS 440–200 samples, the first extruder zone was set at 162° C., and all other zones were set at 232° C. The die air temperature was set at 230° C. and the melt temperature was recorded at 230° C. For PE 6806 samples, the first extruder zone was set at 145° C., and all other zones were set at 230° C. The die air temperature was set at 230° C., and the melt temperature was recorded at 230° C. The metering gear pump speed was set at 70 rpm. The die was configured with an air gap setting of 0.763 millimeter (mm) and a set back of 0.69 mm. With a collector distance of 30.5 cm, the take up speed was set to deliver a melt blown nonwoven formed from the microfibers with a basis weight of 50 grams/m². The nonwoven samples were conditioned at 50% relative humidity (23° C.) and tested for static charge dissipation according to Test Method II.

The effective fiber diameter (EFD) was calculated according to the method set forth in Davies, C. N., "The separation of Airborne Dust and Particles," Institute of Mechanical Engineers, London Proceedings, 1B, 1952.

Example C1 (Comparative)

Samples were prepared according to the General Preparation of Nonwovens using PS 440-200 polyurethane with no antistat. Static charge dissipation data is listed in Table 3.

Example C2 (Comparative)

Samples were prepared according to General Preparation of Nonwovens using PE 6806 polyethylene with no antistat. Static charge dissipation data is listed in Table 4.

Example C3 (Comparative)

Samples were prepared according to General Preparation of Nonwovens using PP 3960 polypropylene with no additives. Static charge dissipation data is listed in Table 5.

Example C4 (Comparative)

Samples were prepared according to General Preparation of Nonwovens using PP 3960 polypropylene with 1% ETHOQUAD™ C/25. Static charge dissipation data is listed in Table 5.

Example C5 (Comparative)

General Preparation of Nonwovens 1 using PP 3960 polypropylene with 1% ETHOQUAD™ 18/25. Static charge dissipation data is listed in Table 5.

Example 1

Samples were prepared according to General Preparation of Nonwovens using PS 440-200 polyurethane and 2% Antistat 1. Static charge dissipation data is listed in Table 3.

Example 2

Samples were prepared according to General Preparation of Nonwovens using PE 6806 polyethylene and 1% Antistat 1. Static charge dissipation data is listed in Table 4.

Example 3

Samples were prepared according to General Preparation of Nonwovens using PP 3960 polypropylene and 1% Antistat 1. Static charge dissipation data is listed in Table 5.

Example 4

Samples were prepared according to General Preparation of Nonwovens using PP 3960 polypropylene and 0.75% Antistat 1. Static charge dissipation data is listed in Table 5.

Example 5

Samples were prepared according to General Preparation of Nonwovens using PP 3960 polypropylene and 0.50% Antistat 1. Static charge dissipation data is listed in Table 5.

Example 6

Samples were prepared according to General Preparation of Nonwovens using PP 3960 polypropylene and 1% Antistat 2. Static charge dissipation data is listed in Table 5.

Example 7

Samples were prepared according to General Preparation of Nonwovens using PP 3960 polypropylene and 1% Antistat 4. Static charge dissipation data is listed in Table 5.

Example 8

Samples were prepared according to General Preparation of Nonwovens using PP 3960 polypropylene and 1% Antistat 5. Static charge dissipation data is listed in Table 5.

Example 9

Samples were prepared according to General Preparation of Nonwovens using PP 3960 polypropylene and 1% Antistat 3. Static charge dissipation data is listed in Table 5.

TABLE 3

Static Charge Dissipation of PS 440-200 Nonwovens

| | | Charge (Kvolts) | | | Decay Rate (seconds) | | |
|---|---|---|---|---|---|---|---|
| Example | EFD* (microns) | 10% RH | 25% RH | 50% RH | 10% RH | 25% RH | 50% RH |
| 1 | 13.4 | 5+ | 5+ | 5+ | 1.08 | 1.06 | 0.473 |
| C-1 | 14.2 | | 5+ | 5+ | | >60 | 46.02 |

*Effective Fiber Diameter

TABLE 4

Static Charge Dissipation of PE 6806 Nonwovens

| | | Charge (Kvolts) | | | Decay Rate (seconds) | | |
|---|---|---|---|---|---|---|---|
| Example | EFD* (microns) | 10% RH | 25% RH | 50% RH | 10% RH | 25% RH | 50% RH |
| 2 | 15.1 | 5+ | 5+ | 5+ | 0.1 | 0.06 | 0.01 |
| C-2 | 14.8 | | | 0.75 | | | >60 |

*Effective Fiber Diameter

TABLE 5

Static Charge Dissipation of PP 3960 Nonwovens

| | | Charge (Kvolts) | | | Decay Rate (seconds) | | |
|---|---|---|---|---|---|---|---|
| Example | EFD* (microns) | 10% RH | 25% RH | 50% RH | 10% RH | 25% RH | 50% RH |
| 3 | 9.5 | 4.45 | 4.99 | 4.99 | 0.26 | 0.3 | 0.41 |
| 4 | 10.1 | | 5+ | 5+ | | >60 | 2.64 |
| 5 | 10.3 | | | 3.75 | | | >60 |
| 6 | 10.7 | 5+ | 5+ | 5+ | 1.83 | 4.66 | 1.74 |
| 7 | 10.1 | | 5+ | 5+ | | >60 | 3.64 |
| 8 | 11.2 | 5+ | 5+ | 5+ | 1.66 | 0.82 | 0.13 |
| 9 | 10.2 | 5.00 | 5+ | 5+ | 2.47 | 3.97 | 0.92 |
| C-3 | 7.9 | | | 2.59 | | | >60 |
| C-4 | 10.2 | | | 5+ | | | >60 |
| C-5 | 10.7 | | | 5+ | | | >60 |

*Effective Fiber Diameter

Topically Coated Polyester Film

Example 10

A 1% solution of Antistat 1 in methylethyl ketone (MEK) was prepared. About 2 mL of solution was pipetted onto the top of a sheet of polyester film having 25.5 cm by 17.8 cm dimensions. The solution was then drawn over the film using a #12 wire wound bar. The resulting coating was dried in a forced air oven for 2.5 minutes at 65° C. and tested according to Test Method III described above. Results are listed in Table 6.

Example 11

A 6% solution of Antistat 1 in methylethyl ketone (MEK) was prepared. About 2 mL of solution was pipetted onto the top of a sheet of polyester film having 25.5 cm by 17.8 cm dimensions. The solution was then drawn over the film using a #12 wire wound bar. The resulting coating was dried in a forced air oven for 2.5 minutes at 65° C. and tested according to Test Method III described above. Results are listed in Table 6.

Example 12

A 1% solution of Antistat 5 in methylethyl ketone (MEK) was prepared. About 2 mL of solution was pipetted onto the top of a sheet of polyester film having 25.5 cm by 17.8 cm dimensions. The solution was then drawn over the film using a #12 wire wound bar. The resulting coating was dried in a forced air oven for 2.5 minutes at 65° C. and tested according to Test Method III described above. Results are listed in Table 6.

Example 13

A 6% solution of Antistat 5 in methylethyl ketone (MEK) was prepared. About 2 mL of solution was pipetted onto the top of a sheet of polyester film having 25.5 cm by 17.8 cm dimensions. The solution was then drawn over the film using a #12 wire wound bar. The resulting coating was dried in a forced air oven for 2.5 minutes at 65° C. and tested according to Test Method III described above. Results are listed in Table 6.

TABLE 6

Surface Resistivity of Topically Coated Polyester Film

| Example | Surface Resistivity (Ohm/cm$^2$) |
|---|---|
| 10 | $1 \times 10^9$ |
| 11 | $6 \times 10^7$ |
| 12 | $2 \times 10^{11}$ |
| 13 | $2 \times 10^{12}$ |

Various modifications and alterations of this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims as set forth herein.

What is claimed is:

1. A melt processable antistatic composition comprising:
   (a) an antistatic agent comprising a polymeric salt consisting of:
      (i) at least one cation represented by the formula:

$$^+N[(R^1)_{4-y}][[POA]R^2]_y$$

where POA is either a homopolymer or a copolymer that is random, blocked, or alternating, and POA comprises 2 to 50 units represented by the formula $((CH_2)_{m'}CH(R^3)O)$ where each unit independently has m' and $R^3$, m' is an integer from 1 to 4, $R^3$ is independently hydrogen or a lower alkyl group, $R^1$ is independently an alkyl, an alicyclic, an aryl, an alkalicyclic, an arylalicyclic, or an alicyclicaryl group that optionally contains one or more heteroatoms, $R^2$ is independently hydrogen, an alkyl, an alicyclic, an aryl, an alkalicyclic, an arylalicyclic, or an alicyclicaryl group that optionally contains one or more heteroatoms, and y is an integer from 1 to 4; and (ii) a fluorinated anion represented by one of the following formulae:

$$R_fSO_3^- \qquad (1)$$

$$^-O_3SR_{f2}SO_3^- \qquad (2)$$

where $R_f$ is independently a perfluoroalkyl, fluoroalkyl, or fluoroaryl group having from 1 to about 12 carbon atoms;

and $R_{f2}$ is independently a perfluoroalkylene, fluoroalkylene, or fluoroarylene group having from 1 to about 10 carbon atoms; and (b) at least one insulating material.

2. The antistatic composition according to claim 1, wherein said heteroatom is selected from the group consisting of sulfur, nitrogen, oxygen, chlorine, bromine, fluorine, and mixtures thereof.

3. The antistatic composition according to claim 1, wherein $R^1$ comprises from 1 to about 20 carbon atoms.

4. The antistatic composition according to claim 1, wherein $R^2$ is hydrogen or comprises from 1 to about 10 carbon atoms.

5. The antistatic composition according to claim 1, wherein $R^3$ is hydrogen or comprises from 1 to about 4 carbon atoms.

6. The antistatic composition according to claim 1, wherein $R_f$ is cyclic.

7. The antistatic composition according to claim 1, wherein said anion comprises a fluoroaryl where said fluoroaryl is aromatic having some or all hydrogen atoms substituted with fluorine atoms or perfluoroalkyl groups.

8. The antistatic composition according to claim 1, wherein said cation comprises at least one polyoxyalkylene moiety bonded to a single ammonium center.

9. The antistatic composition according to claim 1, wherein said anion is selected from the group consisting of perfluoroalkanesulfonates, fluoroarylsulfonates, heteroatom-containing fluoroalkanesulfonates, difunctional fluoroalkanesulfonates, difunctional fluoroarylsulfonates, and mixtures thereof.

10. The antistatic composition according to claim 1, wherein said cation is selected from the group consisting of:

$[(C_{12}H_{25})N^+(CH_3)[(CH_2CH_2O)_mH][(CH_2CH_2O)_nH]]$; (m+n=15), $[(C_6H_5CH_2)N^+(CH_3)[(CH_2CH_2O)_mH][(CH_2CH_2O)_nH]]$; (m+n=15), where $C_6H_5CH_2$=benzyl, $[(C_{18}H_{37})N^+(CH_3)[(CH_2CH_2O)_mH][(CH_2CH_2O)_nH]]$; (m+n=15), $[(C_{18}H_{37})N^+(CH_3)[(CH_2CHO)_mH][(CH_2CHCH_3O)_nH]]$; (m+n=15), $[(C_{12}H_{25})N^+(CH_3)[(CH_2CH_2O)_mH][(CH_2CH_2O)_nH]]$; (m+n=5), $[(C_{12}H_{25})N^+(CH_3)_2[(CH_2CHCH_3O)_mH]]$; (m=15), $[(C_{12}H_{25})N^+(CH_3)_2[(CH_2CH_2CH_2CH_2O)_mH]]$; (m=15), $[(C_{12}H_{25})N^+(CH_3)_2[(CH_2CH_2O)_mH]]$; (m=15), $[(C_8H_{17})N^+(CH_3)_2[(CH_2CH_2O)_mH]]$; (m=8), $[(C_{12}H_{25})N^+[(CH_2CH_2O)_mH][(CH_2CH_2O)_nH][(CH_2CH_2O)_oH]]$; (m+n+o=15) and $[N^+[(CH_2CH_2O)_mH][(CH_2CH_2O)_nH][(CH_2CH_2O)_oH][(CH_2CH_2O)_pH]]$; (m+n+o+p=20); where the number of polyoxyalkylene moieties is approximate.

11. The antistatic composition according to claim 1 wherein said insulating material is selected from the group consisting of synthetic, naturally-occurring polymers, or mixtures thereof.

12. The antistatic composition according to claim 1 wherein said polymeric salt is selected from the group consisting of:

$[(C_{12}H_{25})N^+(CH_3)[(CH_2CH_2O)_mH][(CH_2CH_2O)_nH]][^-O_3SCF_3]$; (m+n=15), $[(C_{12}H_{25})N^+(CH_3)[(CH_2CH_2O)_mH][(CH_2CH_2O)_nH]][^-O_3SC_4F_9]$; (m+n=15), $[(C_6H_5CH_2)N^+(CH_3)[(CH_2CH_2O)_mH][(CH_2CH_2O)_nH]][^-O_3SC_4F_9]$; (m+n=15), where $C_6H_5CH_2$=benzyl, $[(C_{18}H_{37})N^+(CH_3)[(CH_2CH_2O)_mH][(CH_2CH_2O)_nH]][^-O_3SCF_3]$; (m+n=15), $[(C_{18}H_{37})N^+(CH_3)[(CH_2CH_2O)_mH][(CH_2CH_2O)_nH]][^-O_3SC_4F_9]$; (m+n=15), $[(C_{18}H_{37})N^+(CH_3)[(CH_2CHO)_mH][(CH_2CHCH_3O)_nH]][^-O_3SC_4F_9]$; (m+n=15), $[(C_{12}H_{25})N^+(CH_3)[(CH_2CH_2O)_mH][(CH_2CH_2O)_nH]][^-O_3SCF_3]$; (m+n=5), $[(C_8H_{17})N^+(CH_3)_2[(CH_2CH_2O)_mH]][^-O_3SCF_3]$; (m=15), $[(C_8H_{17})N^+(CH_3)_2[(CH_2CH_2O)_mH]][^-O_3SC_4F_9]$; (m=15), $[(C_{12}H_{25})N^+(CH_3)_2[(CH_2CHCH_3O)_mH]][^-O_3SCF_3]$; (m=15), $[(C_{12}H_{25})N^+(CH_3)_2[(CH_2CH_2\,CH_2CH_2O)_mH]][^-O_3SCF_3]$; (m=15), $[(C_{12}H_{25})N^+(CH_3)_2[(CH_2CH_2O)_mH]][^-O_3SCF_3]$; (m=15)

$[(C_8H_{17})N^+(CH_3)_2[(CH_2CH_2O)_mH]][^-O_3SCF_3]$; (m=8)

$[(C_{12}H_{25})N^+[(CH_2CH_2O)_mH][(CH_2CH_2O)_nH][(CH_2CH_2O)_oH]][^-O_3SCF_3]$; (m+n+o=15), $[(C_{12}H_{25})N^+[(CH_2CH_2O)_mH][(CH_2CH_2O)_nH][(CH_2CH_2O)_oH]][^-O_3SC_4F_9]$; (m+n+o=15), $[N^+[(CH_2CH_2O)_mH][(CH_2CH_2O)_nH][(CH_2CH_2O)_oH][(CH_2CH_2O)_pH]][^-O_3SCF_3]$; (m+n+o+p=20), $[(C_{12}H_{25})N^+(CH_3)[(CH_2CH_2O)_mH][(CH_2CH_2O)_nH]]_2[^-O_3SCF_2CF_2CF_2SO_3-]$; (m+n=15), $[(C_{12}H_{25})N^+(CH_3)[(CH_2CH_2O)_mH][(CH_2CH_2O)_nH]]_2[^-O_3SCF_2CF_2N(CF_2CF_2)_2N\,CF_2CF_2SO_3^-]$; (m+n=15), $[(C_{12}H_{25})N^+(CH_3)[(CH_2CH_2O)_mH][(CH_2CH_2O)_nH]][^-O_3SC_6H_4CF_3]$; (m+n=15), $[(C_{12}H_{25})N^+(CH_3)[(CH_2CH_2O)_mH][(CH_2CH_2O)_nH]][^-O_3SC_6F_5]$; (m+n=15) and $[(C_{12}H_{25})N^+(CH_3)[(CH_2CH_2O)_mH][(CH_2CH_2O)_nH]]_2[^-O_3SC_6F_4SO_3^-]$; (m+n=15); where the number of polyoxyalkylene moieties is approximate.

13. An antistatic composition according to claim 1, wherein said anion(s) is selected from the group consisting of $CF_3SO_3^-$, $C_4F_9SO_3^-$, $C_6F_{13}SO_3^-$, $C_8F_{17}SO_3^-$, cyclo-$C_6F_{11}SO_3^-$, 4-$CF_3$—$C_6H_4SO_3^-$, 3,5-$(CF_3)_2C_6H_3SO_3^-$, $C_6F_5SO_3^-$, $CF_3OCF_2CF_2SO_3^-$, $(CF_3)_2NCF_2CF_2SO_3^-$, $SF_5CF_2CF_2SO_3^-$, $^-O_3S(CF_2)_3SO_3^-$, $^-O_3S(CF_2)_4SO_3^-$, $^-O_3S(CF_2)_2O(CF_2)_2SO_3^-$, $^-O_3SC_6F_4SO_3^-$, $^-O_3SCF_2CF_2N(CF_2CF_2)_2NCF_2CF_2SO_3^-$, and mixtures thereof.

14. The antistatic composition according to claim 1, wherein said insulating material is a thermoplastic polymer.

15. The antistatic composition according to claim 14, wherein said thermoplastic polymer is melt processable at temperatures above about 240° C.

16. The antistatic composition according to claim 14, wherein said thermoplastic polymer is selected from the group consisting of polyethylene, polypropylene, polybutylene, poly(ethylene-octene), poly(ethylene-butene), polyurethane, and mixtures thereof.

17. A process for preparing an antistatic composition comprising the steps of:

(a) combining (i) at least one polymeric salt consisting of:
(A) at least one cation represented by the formula:

$^+N[(R^1)_{4-y}][[POA]R^2]_y$ where POA is either a homopolymer or a copolymer that is random, blocked, or alternating, and POA comprises 2 to 50 units represented by the formula $((CH_2)_{m'}CH(R^3)O)$ where each unit independently has m' and $R^3$, m' is an integer from 1 to 4, $R^3$ is independently hydrogen or a lower alkyl group, $R^1$ is independently an alkyl, an alicyclic, an aryl, an alkalicyclic, an arylalicyclic, or an alicyclicaryl group that optionally contains one or more heteroatoms, $R^2$ is independently hydrogen, an alkyl, an alicyclic, an aryl, an alkalicyclic, an arylalicyclic, or an alicyclicaryl group that optionally contains one or more heteroatoms, and y is an integer from 1 to 4; and (B) a fluorinated anion represented by one of the following formulae:

$$R_f SO_3^- \qquad (1)$$

$$^-O_3 S R_{f2} SO_3^- \qquad (2)$$

where $R_f$ is independently a perfluoroalkyl, fluoroalkyl, or fluoroaryl group having from 1 to about 12 carbon atoms and $R_{f2}$ is independently a perfluoroalkylene, fluoroalkylene, or fluoroarylene group having from 1 to about 10 carbon atoms; and (ii) at least one thermoplastic polymer; and (b) melt processing the resulting combination.

* * * * *

UNITED STATES PATENT AND TRADEMARK OFFICE
CERTIFICATE OF CORRECTION

PATENT NO. : 6,740,413 B1 Page 1 of 1
DATED : May 25, 2004
INVENTOR(S) : Klun, Thomas P.

It is certified that error appears in the above-identified patent and that said Letters Patent is hereby corrected as shown below:

Column 1,
Line 31, delete "modem", insert in place thereof -- modern --;

Column 13,
Line 4, after "into" insert -- 9 cm by --; and after "12 cm" delete "by 15 cm";

Column 18,
Line 65, delete "$^{-O}_{3}SR_{f2}SO_{3}^{-}$", insert in place thereof -- $^{-}O_{3}SR_{f2}SO_{3}^{-}$ --.

Signed and Sealed this

Twenty-second Day of March, 2005

JON W. DUDAS
*Director of the United States Patent and Trademark Office*